US009423493B2

(12) United States Patent
Koudar et al.

(10) Patent No.: US 9,423,493 B2
(45) Date of Patent: Aug. 23, 2016

(54) METHOD OF FORMING A TRANSDUCER CONTROLLER AND APPARATUS THEREFROM

(71) Applicant: Semiconductor Components Industries, LLC, Phoenix, AZ (US)

(72) Inventors: Ivan Koudar, Modrice (CZ); Marek Hustava, Bratislava (CZ); Tomas Suchy, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 352 days.

(21) Appl. No.: 14/179,896

(22) Filed: Feb. 13, 2014

(65) Prior Publication Data

US 2014/0265719 A1 Sep. 18, 2014

Related U.S. Application Data

(60) Provisional application No. 61/801,529, filed on Mar. 15, 2013.

(51) Int. Cl.
    H02N 11/00 (2006.01)
    G01S 7/52 (2006.01)
    G01S 7/521 (2006.01)
    B06B 1/02 (2006.01)

(52) U.S. Cl.
    CPC .......... *G01S 7/52004* (2013.01); *B06B 1/0215* (2013.01); *G01S 7/521* (2013.01)

(58) Field of Classification Search
    CPC .... G01S 7/52004; G01S 7/521; B06B 1/0215
    See application file for complete search history.

(56) References Cited

U.S. PATENT DOCUMENTS

| 4,831,565 | A | * | 5/1989 | Woodward | G01F 23/2962 367/99 |
| 5,079,751 | A | * | 1/1992 | Woodward | G01S 7/003 367/96 |
| 5,157,639 | A | * | 10/1992 | Leszczynski | G01S 7/539 367/908 |
| 5,212,444 | A | * | 5/1993 | Abramovich | G01B 7/003 324/207.13 |
| 5,277,065 | A | * | 1/1994 | Leszczynski | G01F 23/2962 367/903 |
| 5,335,545 | A | * | 8/1994 | Leszczynski | G01F 23/2962 367/903 |
| 5,483,501 | A | * | 1/1996 | Park | B06B 1/0688 310/317 |
| 5,991,234 | A | * | 11/1999 | Sejalon | B06B 1/0246 367/13 |
| 6,040,765 | A | | 3/2000 | Cherry et al. | |
| 8,699,299 | B2 | * | 4/2014 | Horsky | B06B 1/0253 367/95 |
| 9,151,840 | B2 | * | 10/2015 | Koudar | G01S 15/08 |
| 2003/0015977 | A1 | * | 1/2003 | Lee | B06B 1/0261 318/114 |
| 2004/0004905 | A1 | * | 1/2004 | Lyon | G01S 7/52004 367/13 |

(Continued)

FOREIGN PATENT DOCUMENTS

EP 1410950 B1 12/2011

OTHER PUBLICATIONS

Maxim, "16-Bit, RISC, Microcontroller-Based, Ultrasonic Distance-Measuring System", MAXQ7667 Data Sheet, 19-4598; Rev 1; Jul. 2009, Copyright 2009 Maxim Integrated Products, 40 pages.

(Continued)

*Primary Examiner* — Daniel Pihulic
(74) *Attorney, Agent, or Firm* — Robert F. Hightower

(57) ABSTRACT

In one embodiment, a transducer controller is configured to form an integrated distance measuring and diagnostic cycle that includes measuring a decay time of a transducer and to selectively adjust a period of the transmitted signal responsively to a value of a reverberation period.

20 Claims, 6 Drawing Sheets

(56) References Cited

U.S. PATENT DOCUMENTS

| | | | |
|---|---|---|---|
| 2004/0226378 A1* | 11/2004 | Oda | B06B 1/0215 73/586 |
| 2007/0261895 A1* | 11/2007 | Knowles | G06F 3/0436 178/18.04 |
| 2010/0329080 A1 | 12/2010 | Frank et al. | |
| 2011/0261652 A1* | 10/2011 | Horsky | B06B 1/0253 367/97 |
| 2013/0235700 A1* | 9/2013 | Koudar | G01S 15/08 367/99 |
| 2014/0265719 A1* | 9/2014 | Koudar | G01S 7/52004 310/300 |

OTHER PUBLICATIONS

Maxim Integrated, "MAXQ7667 Transducer Diagnostics", Application Note 4398, Copyright Maxim Integrated Products, Jun. 2, 2009, 8 pages.

* cited by examiner

METHOD OF FORMING A TRANSDUCER CONTROLLER AND APPARATUS THEREFROM

PRIORITY CLAIM TO PRIOR PROVISIONAL FILING

This application claims priority to prior filed Provisional Application No. 61/801,529 entitled "Ultrasonic transducer defect diagnosis and automatic fine tuning of TX frequency" filed on Mar. 15, 2013, and having common inventors Koudar et al. which is hereby incorporated herein by reference

BACKGROUND OF THE INVENTION

The present invention relates, in general, to electronics, and more particularly, to semiconductors, structures thereof, and methods of forming semiconductor devices.

In the past, various methods and devices were developed for acoustic measurement systems. Acoustic measurement systems were used in a wide variety of applications, including in automotive applications for detecting the distance, as well as the rate of change of distance, between the vehicle and objects in the vicinity of the vehicle, such as other vehicles or people. Some of the methods used by prior acoustic measurement systems for calibrating or adjusting the acoustic measurement system resulted in inaccurate measurements and some were especially inaccurate for short range measurements. In some example systems, the transmitted pulse duration and the decay time of the sonic transducer could result in an unusable area in which the ultrasonic sensor could not detect an object.

Some applications included a separate operation to check and/or possibly adjust the transmitter frequency. The system could not be used for detecting distances during this separate operation thereby reducing system performance. A method measuring the transducer settling time and varying the receiver center frequency in disclosed in European patent no. EP 1410950 B1. Another example may be described in an application note no. AN4398 from Maxim corporation of 160 Rio Robles, San Jose, Calif. 95134. One disadvantage of this method and other known transducer diagnostic methods based on settling time measurement is the necessity to perform the transducer diagnostic over a separate predetermined time period before the actual process of monitoring the system in order to test the freedom of the transducer from defects and separately from making a distance measurement. Such an operation could decrease system efficiency and could place an increased load on the controller.

Accordingly, it is desirable to have an acoustic measurement system including circuits and/or methods therefor that include more accurate calibration and/or adjustments that facilitate improved efficiency and/or improved accuracy.

Figure 1:
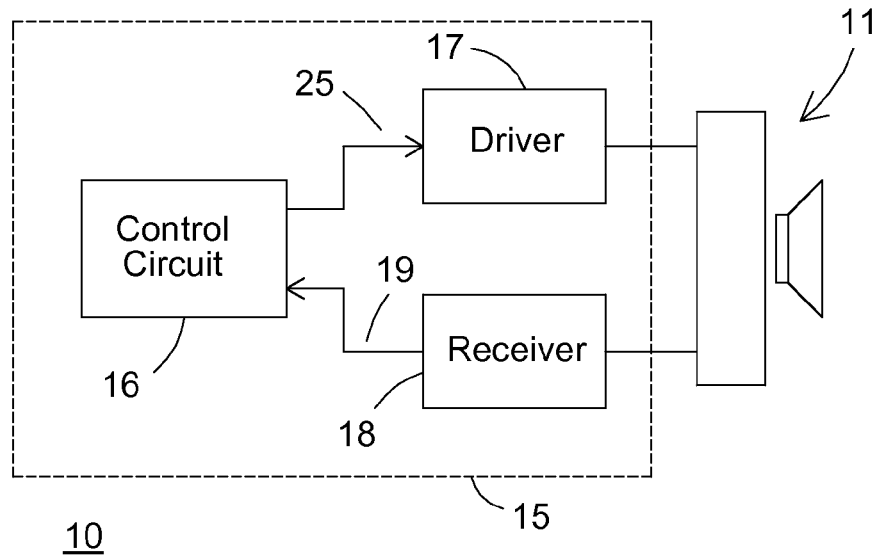
FIG. 1 schematically illustrates a generalized example of an embodiment of a portion of an acoustic system that includes an acoustic transducer controller in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements are omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element my a carry current in one direction through a device, such as carry current entering the device, and a second current carrying element may carry current in an opposite direction through the device, such as carry current leaving the device. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

FIG. 1 schematically illustrates a generalized example of an embodiment of a portion of an acoustic system 10 that includes an acoustic transducer controller 15 which is configured to provide more efficient operation of system 10 and to provide more accurate measurements. System 10 typically includes an acoustic transducer 11. In one embodiment, transducer 11 may be an ultrasonic transducer. Transducer 11 may have a variety of implementations including being formed as a piezoceramic element with an attached membrane for acoustic interface. Other embodiments of transducer 11 may have various other forms including having a separate transmitter, such as for example an ultrasonic transmitter that transmits ultrasonic sound waves, and a receiver, such as for example an ultrasonic receiver that receives ultrasonic sounds or waves. As will be seen further hereinafter, controller 15 is configured to control transducer 11 to form an integrated distance measurement and diagnostic cycle (IMDC) that includes multiple phases where the multiple phases include a driving phase of driving transducer 11 with a drive signal having a first period to form a transmitted acoustic signal, a subsequent second phase or diagnostic phase which includes performing a diagnostic operation after terminating the drive signal, and a subsequent third phase or measurement phase that includes receiving a reflected acoustic signal or echo from the transmitted acoustic signal and using the reflected acoustic signal to measure the distance to an object.

Controller 15 typically includes a control circuit 16 that is utilized to perform the integrated diagnostic phase and measurement cycle. During the first phase or drive phase, circuit 16 may generate patterns to transmit through transducer 11. A driver circuit 17 of controller 15 may be configured to receive a drive signal 25 from circuit 16 and form a signal suitable for exciting transducer 11. In an embodiment, circuit 16 may be a power driver dedicated for excitation of the transducer 11. An embodiment may include that drive signal 25 includes a burst of pulses. In some embodiments a period of the pulses is approximately the center frequency of transducer 11. A receiver circuit 18 may be configured to receive a signal from transducer 11 that is representative of the reflected ultrasonic signal received by transducer 11. Circuit 18 may include operational amplifiers and/or filters, or analog-to-digital converters, or a digital signal processor, or other circuits to provide a received signal 19 that is representative of the reflected acoustic signal or echo received by transducer 11. Control circuit 16 may include a microprocessor or digital signal processor or other logic and/or control circuits. In some embodiments, driver 17 and/or receiver 18 may be a portion of circuit 16.

Those skilled in the art will appreciate that after transducer 11 is excited with drive signal 25 and the drive signal is terminated, transducer 11 typically will resonate for some period of time or time interval after the drive signal is removed. This resonation generally is referred to as reverberation and the period of each cycle of the reverberations of transducer 11 is referred to as the reverberation period (RVBP). Those skilled in the art will understand that the reverberation period may be different from the period of the transmitted acoustic and may be different from the period of drive signal 25 that is used to excited transducer 11. As will be seen further hereinafter, receiver 18 may also receive reverberation signals from reverberations formed by transducer 11. For example, the reverberations of transducer 11 may be received by transducer 11 and circuit 18 may form signal 19 that is representative of the reverberations of transducer 11. In other embodiments, the reverberations of transducer 11 may be received by a different circuit or method.

Figure 2:
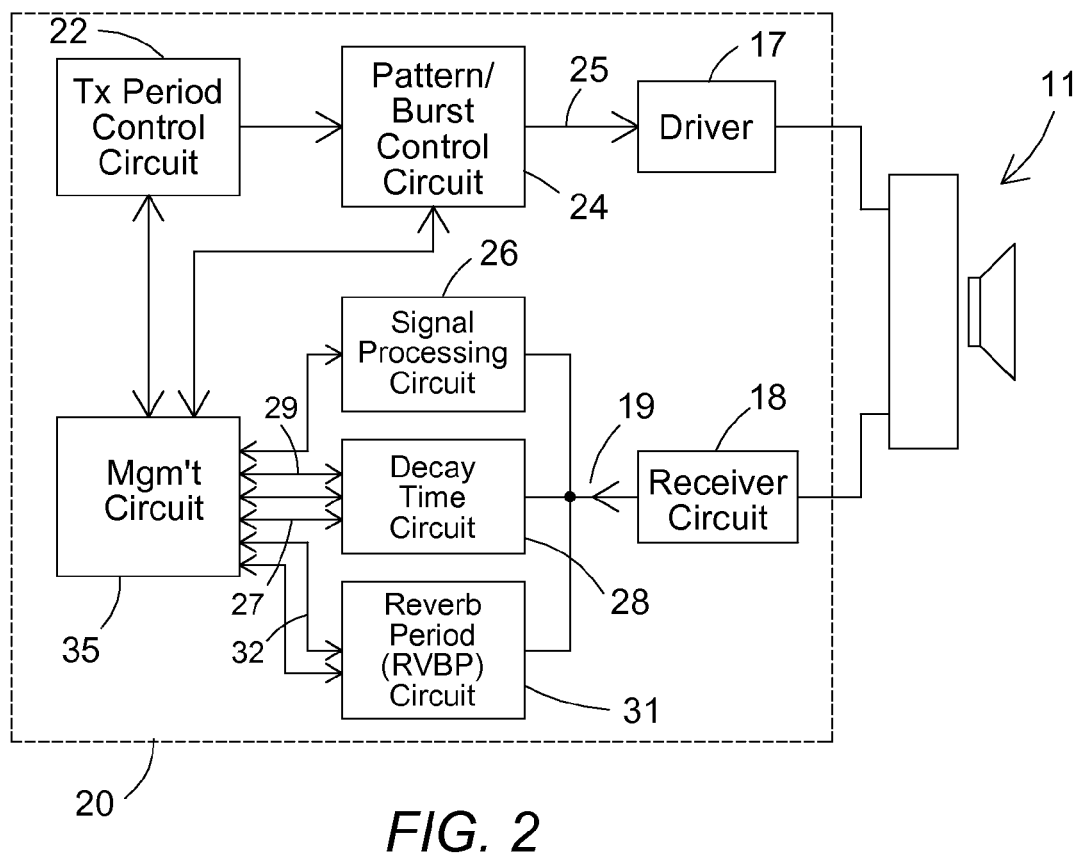
FIG. 2 schematically illustrates an example of an embodiment of a portion of a transducer controller that is an alternate embodiment of the controller of FIG. 1 in accordance with the present invention.

FIG. 2 schematically illustrates an example of an embodiment of a portion of a transducer controller 20 that is an alternate embodiment of controller 15 and is similar to controller 15. Controller 20 may include a variety of circuits that jointly function similarly to control circuit 16 (FIG. 1). Controller 20 may include a transmit period control circuit or Tx period control circuit 22 that may be used to control and/or adjust the period of drive signal 25. A pattern/burst control circuit or burst circuit 24 may be utilized to control or form the pattern used for forming signal 25. For example, drive signal 25 may include a series of pulses, for example a series of high and low patterns, that are used to drive transducer 11. A reverberation period (RVBP) circuit 31 may be used to measure the period of the reverberations of transducer 11. A decay time circuit 28 may be utilized to measure a decay time interval (DTI) of transducer 11. In one embodiment, controller 20 is configured to form a decay time interval signal 29 that is representative of the decay time of transducer 11. An embodiment may include that controller 20 may be formed to evaluate or formed to measure the reverberation time of transducer 11. For example, an embodiment may include configuring controller 20 to evaluate signal 29 to determine or to measure the decay time of transducer 11. A signal processing circuit 26 may be utilized to process received signal 19 from transducer 11 in order to assist controller 20 in calculating a distance of an object from transducer 11. A management circuit 35 may be configured to control portions of the operations of circuits 22, 24, 26, 28, and 31.

Figure 3:
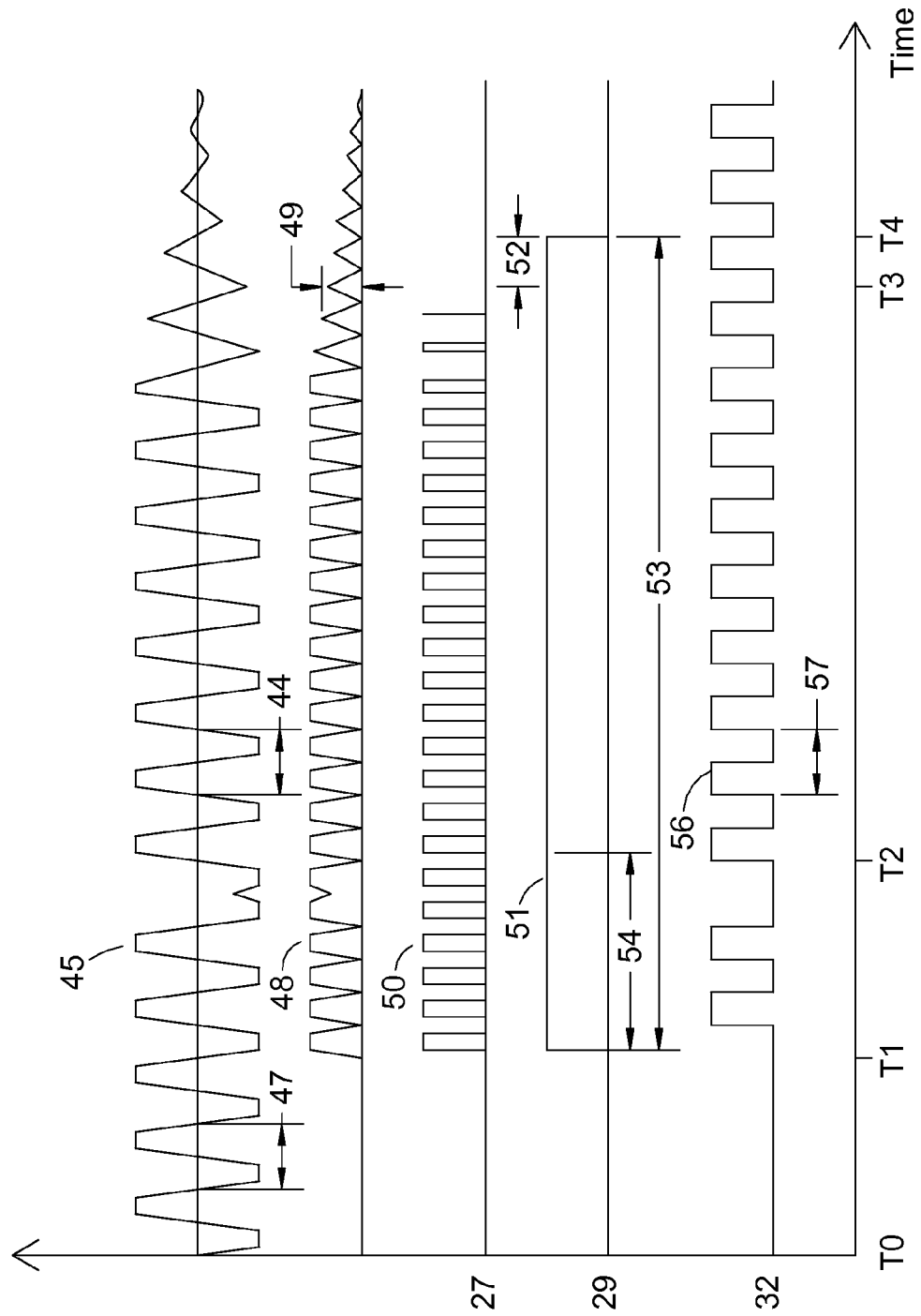
FIG. 3 is a graph having plots that illustrate some signals formed during the operation of the controller of FIG. 2 in accordance with the present invention.

FIG. 3 is a graph having plots that illustrate some signals formed during the operation of controllers 15 and/or 20. The abscissa indicates time and the ordinate indicates increasing values of the illustrated signal. A plot 45 illustrates portions of signal 19 received in response to drive signal 25 exciting transducer 11. For example, in response to receiving the reverberations of transducer 11. Between a time T0 and a time T1, plot 45 illustrates signal 19 received in response to drive signal 25 exciting transducer 11. The portion of plot 45 after time T1 illustrates signal 19 that is representative of the reverberations of transducer 11 after drive signal 25 is terminated. A plot 48 illustrates a rectified embodiment of receiver signal 19 formed as a result of the reverberations of transducer 11. A plot 50 illustrates a reverberation detect signal of controller 20, such as for example reverberation detect signal 27 that may be formed by circuit 28, and a plot 51 illustrates a decay time interval (DTI) of transducer 11 as may be represented by signal 29 of circuit 28. A plot 56 illustrates a reverberation period (RVBP) signal or reverberation signal, such as for example a reverberation signal 32 that may be formed by circuit 31, that is representative of the reverberations that are illustrated in plot 45.

Figure 4:
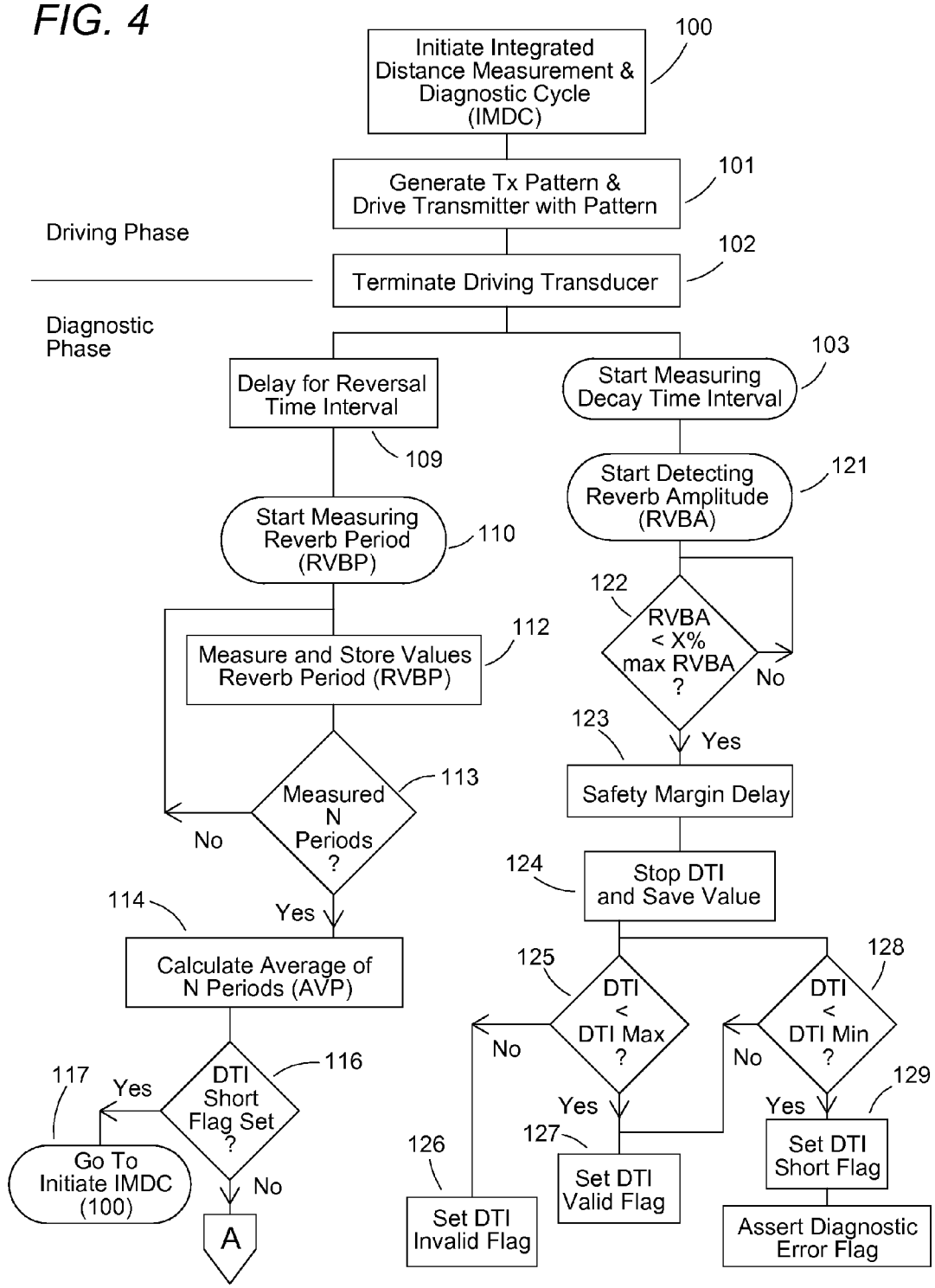
FIG. 4 is a flowchart illustrating examples of portions of embodiments of some steps of a method that may be formed by the controller of FIG. 2 in accordance with the present invention.
Figure 4:
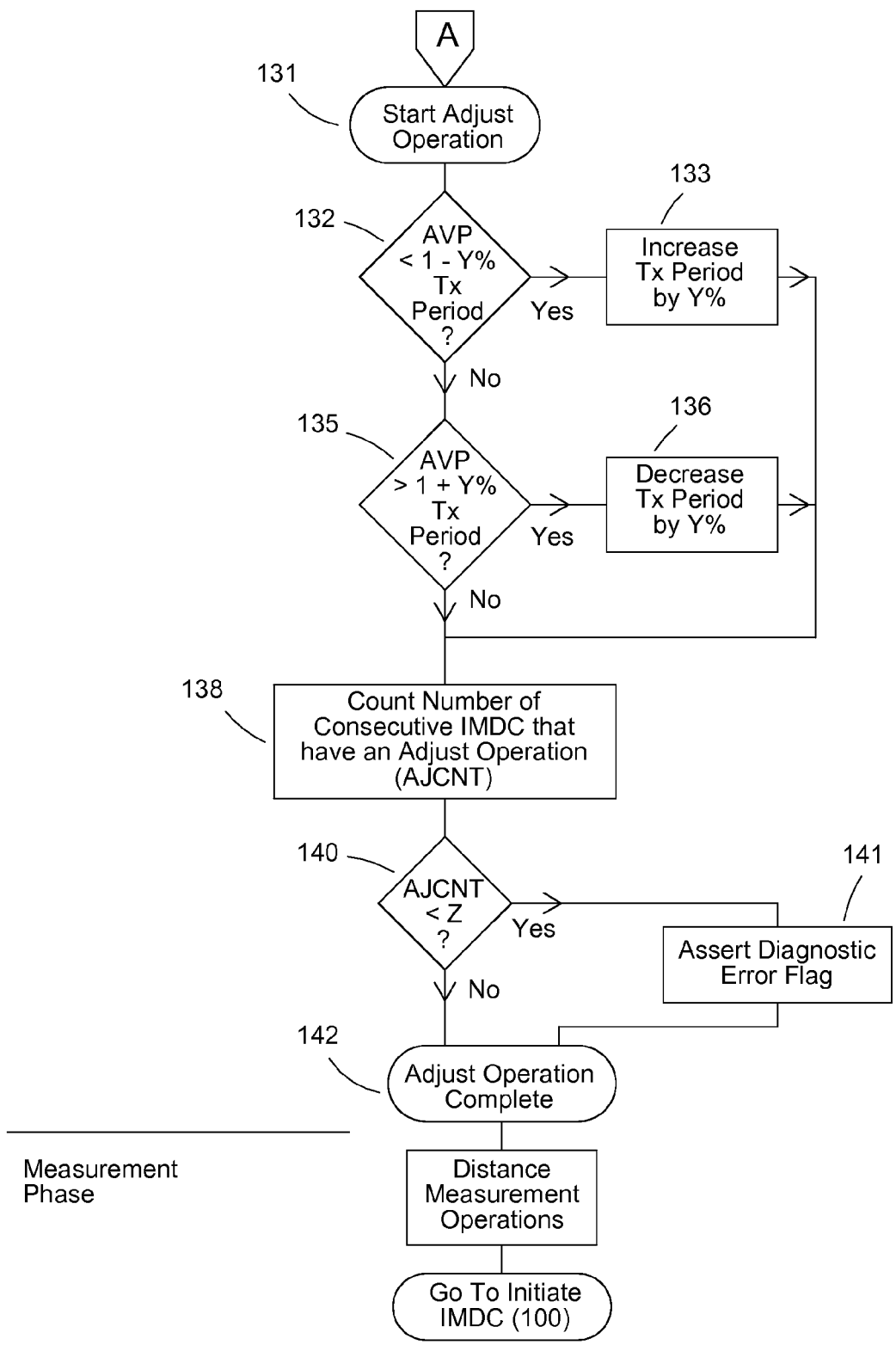

FIG. 4 is a flowchart illustrating examples of portions of embodiments of some steps of a method that may be formed by controllers 15 and/or 20. This description makes references to FIG. 2-FIG. 4. Assume that controller 20 is has begun performing an integrated measurement and diagnostic cycle (IMDC) as illustrated at step 100 of FIG. 4. Assume that, as a portion of the IMDC, at time T0 (FIG. 3) controller 20 is forming drive signal 25 and driving transducer 11 therewith as illustrated by plot 45 (FIG. 3) and a step 101 of FIG. 4. Drive signal 25 excites transducer 11 to vibrate with a transmit period as illustrated by a period 47 of plot 45. As illustrated by a step 102 of FIG. 4, assume that at a time T1 (FIG. 3) controller 20 terminates drive signal 25 thereby terminating the driving phase of the integrated measurement and diagnostic cycle (IDMC). After controller 20 terminates drive signal 25, transducer 11 begins to reverberate.

Controller 20 is configured to perform the diagnostic phase of the integrated measurement and diagnostic cycle (IMDC) after the drive phase and prior to starting the measurement phase. Controller 20 may be configured to begin performing the diagnostic phase substantially after drive signal 25 is terminated (such as illustrated after step 102 of FIG. 4) and in one example embodiment directly after terminating signal 25. In one embodiment, the diagnostic phase may be performed during a reverberation period of transducer 11. Controller 20 is configured to perform two parallel diagnostic operations during the diagnostic phase to determine the operating condition of transducer 11. During one diagnostic operation, controller 20 is configured to measure the decay time interval (DTI) or decay time required for the reverberations of transducer 11 to decay such as illustrated by plot 45 (for example, such as illustrated by steps 103 and 121-127). Controller 20 is configured to form the parallel operation to measure the reverberation period (RVBP) of transducer 11 (such as for example illustrated by steps 109-114). The diagnostic phase may also include an adjustment operation to determine if the transmitter frequency needs to be adjusted, how much to adjust it, and the step of adjusting it as illustrated for example by steps 131-142 of FIG. 4). In other embodiments, the adjustment operation may be performed after the diagnostic phase. For example, the adjustment operation may be performed in parallel with a portion of the measurement phase.

In the early portion of the reverberation phase of transducer 11, the reverberations may reverse such as illustrated by plots 45 and 48 between time T1 and a time T2. Consequently, in an optional embodiment controller 20 may be configured to delay a reversal time interval 54, illustrated by an arrow, after terminating drive signal 25 and prior to calculating the reverberation period (RVBP). In one embodiment, the reversal time interval is a portion of the decay time interval but may be excluded from the decay time interval (DTI) in other embodiments. As illustrated by the flowchart in FIG. 4, controller 20 is configured to begin the diagnostic phase and initiate calculating the decay time interval (DTI) at a step 103.

Controller 20 may be configured to continue calculating the decay time interval (DTI) such as for example until the amplitude of the reverberations have decayed. In an embodiment, the decay time interval is completed if the amplitude has decayed or decreased to less than a desired value. For example, the desired value may be a percentage of the maximum value of the amplitude of the reverberations. In one embodiment, the desired value may be that the amplitude has decayed to the desired value for at least a safety margin time interval 52 (FIG. 3). An embodiment may include that the amplitude has decayed to no greater than approximately seventy five percent (75%) of the maximum value for at least sixty micro seconds (60 us). One embodiment may include that the sixty micro seconds (60 us) may be safety margin time interval 52 (FIG. 3). In another example, the desired value may be an absolute value such as a value in dB, and another embodiment may include that the desired value may be 60 dB below the value of the direct sound. In an embodiment, controller 20 may be configured to measure the decay time as the time required for the amplitude of the reverberations to decay down to a value at which transducer 11 is usable for receiving the reflected signal or echo. An embodiment may include that controller 20 may be configured to measure the decay time as the time required for the amplitude of the reverberations to decay down to a certain absolute value. In one embodiment, controller 20 is configured to calculate the decay time interval (DTI) to include a safety margin time interval 52 (FIG. 3) after the amplitude is decreased to the desired value. Safety margin time interval 52 is illustrated by an arrow in plot 51. In one embodiment, controller 20 may be configured to begin detecting the amplitude of the reverberations or the reverberation amplitude (RVBA) as illustrated at a step 121. An optional embodiment may include that controller 20 is configured to begin measuring the reverberation amplitude after the reversal time 54 has expired. If the reverberation amplitude is greater than the desired value, controller 20 is configured to continue monitoring or detecting the reverberation amplitude (RVBA). Referring to FIG. 3, assume that at a time T3 the reverberation amplitude (RVBA) is no less than the desired value. Controller 20 may be configured to delay safety margin time interval 52 as illustrated at step 123 in FIG. 4 and then save the calculated value as the value of the decay time interval. If the value of the decay time interval is less than a maximum allowable decay time interval, controller 20 is configured to set a DTI valid flag or DTI valid signal indicating that transducer 11 has acceptable operation. As illustrated in FIG. 4 at a step 125, controller 20 may be configured to compare the calculated value of the decay time interval to a maximum acceptable decay time value and if the decay time interval is less than the maximum, controller 20 can set the DTI valid signal at step 127. If the decay time interval is no less than the maximum time interval, controller 20 may be configured to assert a DTI invalid flag or invalid DTI signal such as at a step 126. An alternate embodiment may include configuring controller 20 determine if the decay time is no greater than a minimum value of allowable decay time values and if so, assert a DTI short flag or DTI short signal as illustrated at steps 128 and 129 of FIG. 4. In an embodiment, if the decay time is less than the minimum time it is considered a transducer error and a diagnostic error flag or transducer error signal may be asserted.

Controller 20 is configured to perform a parallel operation of measuring the reverberation period (RVBP) during the diagnostic phase and in parallel with at least a portion of the steps of calculating the decay time interval. Some examples of steps to measure the reverberation period may be illustrated in FIG. 4 steps 109-117. In one embodiment controller 20 may be configured to form reverberation period signal 32 to include a reverberation period 57 that is representative of the reverberation period 44 of the reverberations of transducer 11. In one embodiment, controller 20 may be configured to measure a plurality of reverberation periods and form an average value of the plurality of reverberation periods to represent the reverberation period of transducer 11. For example, controller 20 may be configured to start measuring the reverberation period, for example after expiration of the reversal time interval. Controller 20 may measure and store values of a plurality (for example, N number) of reverberation periods and store each value as illustrated by steps 112-113 (FIG. 4). Subsequent to measuring the N number of periods, controller 20 may be configured to calculate an average value as illustrated in step 114. In most systems, the decay time interval (DTI) is much greater than the time required to calculate the N number of reverberation periods, thus, controller 20 typically would complete the calculation of the reverberation period (RVBP) prior to completing the calculation of the decay time interval (DTI). In an embodiment, controller 20 may also be configured to determine if the decay time interval is no greater than the minimum decay time interval prior to performing the adjust operations of steps 131-142. Those skilled in the art will understand that even though step 116 illustrates checking the DTI time interval for being too short, other steps may be used to terminate the adjusting steps and/or the RVBP measuring steps. For example, if the DTI time interval is too short the result of step 128 may terminate the steps of measuring the reverberation period and/or the adjust steps of steps 131-142.

As a portion of the diagnostic operations during the diagnostic phase, controller 20 is also configured to adjust the period of the drive signal in response to the value of the reverberation period (RVBP). In an embodiment, controller 20 may also be configured to adjust the period of the drive signal in response to the value of the decay time interval (DTI) and/or the value of the reverberation period (RVBP). In one embodiment, controller 25 may be configured to adjust the drive signal period only if the decay time interval is larger than the minimum desired value (DTI MIN) of the decay time interval. For example, if the DTI short signal or DTI short flag is not asserted. In an embodiment, controller 20 is configured to increase the value of the transmitter period if the value of the reverberation period is less than the value of the drive signal period by a desired range. For example, if the reverberation period is a fixed percent less than the drive signal period. An embodiment may include configuring controller 20 to increase the drive signal period by the fixed percent or by the desired range. In an embodiment, controller 20 is configured to decrease the value of the transmitter period if DTI is greater than DTI MAX and if the value of the reverberation period is greater than the value of the drive signal period by a desired range. This desired range may be the same as the desired range in step 132 or may be a different range. An embodiment may include that controller 20 is configured to decrease the transmitter period by the desired range or fixed percentage. FIG. 4 illustrates in steps 132-133 and 135-136 examples of steps of controller 20 increasing or decreasing the drive signal period by a desired range or a percent if the reverberation period is respectively less than or greater than the drive signal period.

An embodiment of the diagnostic phase may include configuring controller 20 to determine the number of consecutive integrated distance measuring and diagnostic cycles (IMDC) in which the drive signal frequency has been adjusted. If the number of consecutive cycles is greater than a desired number, controller 20 may set a flag or signal indication that transducer 11 is defective. An embodiment may include configuring controller 20 to set a transducer error signal such as for example asserting a diagnostic error flag. FIG. 4 illustrates one example diagnostic operation in steps 138, 140, and 141 that include configuring controller 20 to count the number of consecutive integrated measurement and diagnostic cycles (IMDC) that have included adjusting the drive signal or transmitter period. If the number is greater than a desired number, such as a number Z for example, controller 20 asserts a transducer error signal or error flag. In one example embodiment, the number may be four (4). In one embodiment controller 20 is configured to continue to the measurement phase as illustrated by step 127 after setting the transducer error signal. In other embodiments, controller 20 may be configured to perform other operations or to inhibit performing the subsequent measuring operation and/or to inhibit forming a subsequent integrated distance measurement and diagnostic cycle(s) (IMDC).

Subsequent to the diagnostic phase, controller 20 is configured to receive a signal from transducer 11 that is representative of the reflected signal and to use the reflected signal to perform operations to measure the distance of an object from transducer 11.

Figure 5:
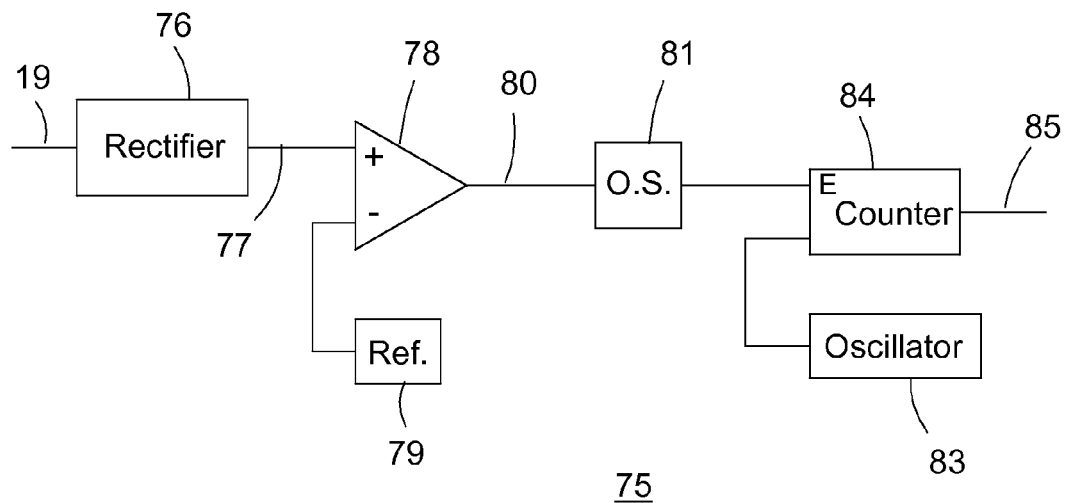
FIG. 5 schematically illustrates an example of a portion of an embodiment of an alternate embodiment of a circuit of the controller of FIG. 2 in accordance with the present invention.

FIG. 5 schematically illustrates an example of a portion of an embodiment of a decay time circuit 75 that is an example of an alternate embodiment of circuit 28 illustrated in FIG. 2. This description has references to at least FIG. 3 and FIG. 5. Circuit 75 may include rectifier 76 that rectifies received signal 19 to form a rectified reverberation signal 77 that is substantially similar to plot 48 illustrated in FIG. 3. A comparator 78 may be utilized to compare signal 77 to a reference signal formed by a reference generator circuit or reference or Ref 79, and to detect when the amplitude of the reverberations of transducer 11 are no greater than a desired value. The desired value may be the value of the signal from Ref 79. In some embodiments, Ref 79 may be adjustable or selectively adjustable. Comparator 78 may form a detect signal 80 which is asserted in response to the reverberations of transducer 11 being greater than the desired value. Circuit 75 may form compare signal 80 substantially similar to signal 27 (FIG. 2) and substantially similar to plot 50 illustrated in FIG. 3. Circuit 75 also includes a timing section that assists in forming an DTI signal 85 that is similar to DTI signal 29 of FIG. 2. In one embodiment, the timing section may include a re-trigger able one-shot 81 that may be triggered on each rising edge (or alternately each falling edge or alternately each edge) of signal 80. The timing interval for re-triggerable one-shot 81 may be approximately equal to safety margin time interval 52 illustrated in plot 51 of FIG. 3. An oscillator 83 is configured to provide a clock signal to a counter 84. Counter 84 is enabled to be incremented or decremented or count in response to the asserted value of signal 85. The value of counter 84 when re-triggerable one-shot 81 becomes negated represents the value of the decay time interval. Signal 85 is negated when re-triggerable one-shot 81 becomes negated. Consequently, circuit 75 is configured to measure the decay time interval (DTI) including safety margin time interval 52, and to form a signal representative of the DTI. In one embodiment, the period of the clock signal from oscillator 83 may be much less the reverberation period. Those skilled in the art will appreciate that circuit 75 is just one example embodiment of a circuit that may be used to measure the decay time interval. Those skilled in the art will also understand that circuit 75 may include other elements to assist in performing all the functions for circuit 75 and that only basic elements are illustrated in FIG. 5 in order to convey the idea of an embodiment to measure the decay time interval. In other embodiments, a digital signal processor or other circuit(s) may be used to measure the decay time interval.

Figure 6:
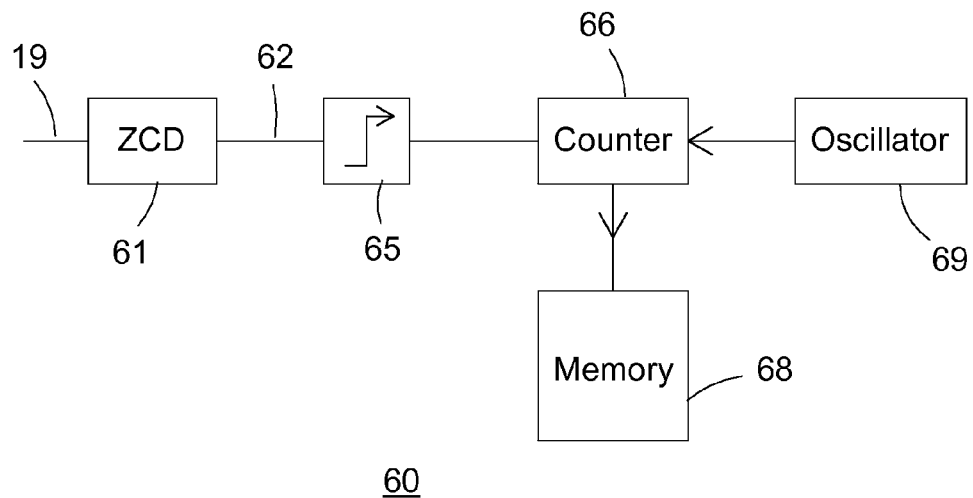
FIG. 6 schematically illustrates an example of a portion of an embodiment of an alternate embodiment of another circuit of the controller of FIG. 2 in accordance with the present invention.

FIG. 6 schematically illustrates an example of an embodiment of a portion of a reverberation period measuring circuit 60 that is an alternate embodiment of circuit 31 illustrated in FIG. 2. Circuit 60 includes a zero crossing detector circuit or detector 61 that receives signal 19 and forms a reverberation signal 62 that is similar to signal 32 and similar to plot 56 illustrated in FIG. 3. Detector 61 forms signal 62 as a digital signal having a period that is substantially equal to reverberation period 57 illustrated in FIG. 3. An oscillator 69 can form a clock signal that can be used to clock a counter 66 in order to determine the time interval of a period of signal 62. A memory 68 may be utilized to store values of counter 66. In one embodiment, an edge detector 65 detects an edge of signal 62, for example detects each rising edge or alternately each falling edge, and generates a short pulse. The short pulse stores the previous value of counter 66 in a memory location of memory 68 and enables counter 66 to begin counting the time interval of the current reverberation period. Consequently the next pulse from detector 65 stores the calculated time interval into another location of memory 68 and enables counter 66 to begin counting the time interval of the new current reverberation period. Those skilled in the art will also understand that circuit 60 may include other elements to assist in performing all the functions for circuit 60 and that only basic elements are illustrated in FIG. 6 in order to convey the idea of an embodiment to measure the reverberation period. In other embodiments, a digital signal processor or other circuit(s) may be used to measure the reverberation period.

Figure 7:
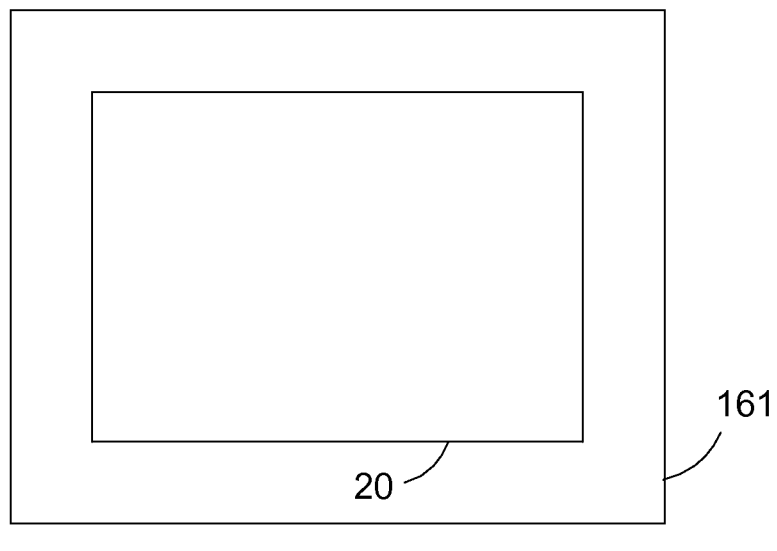
FIG. 7 illustrates an enlarged plan view of a semiconductor device that includes the controller of FIG. 2 in accordance with the present invention.

FIG. 7 illustrates an enlarged plan view of a portion of an embodiment of a semiconductor device or integrated circuit 160 that is formed on a semiconductor die 161. Controller 20 is formed on die 161. Die 161 may also include other circuits that are not shown in FIG. 7 for simplicity of the drawing. Controller 20 and device or integrated circuit 160 are formed on die 161 by semiconductor manufacturing techniques that are well known to those skilled in the art.

From all the foregoing, one skilled in the art will understand that an embodiment of a transducer controller may comprise:

a transmit control circuit configured to form a drive signal having a first period, for example period 47, and a first frequency to excite a transducer, for example transducer 11, to emit an emitted signal;

a decay time circuit configured to measure a decay time interval for a reverberation of the transducer to decay a first value;

a control circuit, such as circuit 35 for example, configured to assert a decay time error signal, such as for example the DTI invalid signal, responsively to the decay time interval being no less than a first value;

a reverberation period circuit configured to measure a reverberation period of the reverberation responsively to an asserted state of the decay time error signal;

the control circuit configured to adjust the first period responsively to a difference between the first period and the reverberation period including increase the first period responsively to the reverberation period being less than the first period and to decrease the first period responsively to the reverberation period being no less than the first period; and the transducer controller configured receive a reflected signal representative of a reflection of the emitted signal subsequently to the operation to adjust the first period, and to use the reflected signal to calculate a distance of an object from the transducer.

In an embodiment, the transducer controller may be configured to assert a transducer error signal responsively to receiving the asserted state of the decay time error signal consecutively for a first number of consecutive repeated sequences wherein each sequence includes the operations of to form the drive signal, adjust the first period, and measure the distance.

An embodiment may include that the transducer controller is configured to terminate forming the drive signal responsively to the asserted state of the transducer error signal.

Another embodiment may include a signal processing circuit configured to receive the reflected signal and to calculate distance information from the reflected signal.

An embodiment may include a circuit to determine a time for a plurality of reverberation periods, to store a value for each of the plurality of reverberation periods, and to form an average value of the plurality of stored values, and to compare the average value to the first period to determine how to adjust the first period.

Another embodiment may include a memory circuit and wherein the reverberation period circuit stores the values in the memory circuit.

An embodiment may include that the control circuit may be configured to adjust the first period responsively to a difference of at least a first percent between the first period and the reverberation period wherein the first percent is a percent of the first period.

In an embodiment the first percent may be approximately one half of a percent of the first period.

An embodiment may include that the control circuit is configured to adjust the first period by approximately the first percent.

Those skilled in the art will understand that a method of forming a transducer controller may comprise:

configuring the transducer controller, for example controller 20, to form a drive signal having a first period, for example period 47, and a frequency to excite a transducer to emit an emitted signal;

configuring the transducer controller to terminate the drive signal, such as for example terminate signal 25 at time T1;

configuring the transducer controller to measure a second period, such as for example period 44 or a signal that is representative of period 44 such as signal 32 and period 57, of a reverberation signal formed by a resonation of the transducer resulting from the termination of the drive signal;

configuring the transducer controller to adjust the first period of the drive signal responsively to a value of the second period;

configuring the transducer controller to conduct a distance measuring operation subsequently to measuring the second period wherein the distance measuring uses a distance signal received by the transducer controller and includes a reflection of at least a portion of the emitted signal; and configuring the transducer controller to form another drive signal to excite the transducer wherein the drive signal has a third period that is different from the first period.

In an embodiment, the method may include configuring the transducer controller to adjust the first period of the drive signal prior to receiving the reflection.

An embodiment of the method may include configuring the transducer controller to adjust the first period includes configuring the transducer controller to increase the first period of the drive signal responsively to the second period being substantially less than the first period and to decrease the first period responsively to the second period being substantially greater than the first period.

In an embodiment the method may include configuring the transducer controller to measure a decay time of the transducer subsequently to the operation to terminate the drive signal wherein the operation to measure the second period is performed in parallel to at least a portion of the operation to measure the decay time.

Another embodiment may include configuring the transducer controller to inhibit the operation to measure the second period responsively to the decay time being substantially less than a first value and to enable the operation to measure the second period responsively to the decay time being approximately no less than the first value.

Those skilled in the art will understand that a method of forming a transducer controller may comprise:

configuring the transducer controller to drive a transducer with a signal having a first period to form an emitted signal and to measure a distance to an object;

configuring the transducer controller to measure a reverberation period of a reverberation of the transducer;

configuring the transducer controller to adjust the first period responsively to a the reverberation period wherein the measure and the adjust is portion of the operation to measure the distance to the object; and configuring the transducer controller to subsequently receive the reflected signal from the emitted signal and to use the reflected signal to calculate a distance.

An embodiment of the method may include configuring the transducer controller to measure the reverberation period of the reverberation of the transducer, and to adjust the first period includes configuring the transducer controller to terminate the drive signal and the emitted signal, and to measure the reverberation period between terminating the drive signal and receiving a reflected signal from the emitted signal.

Another embodiment may include configuring the transducer controller to measure the reverberation period of the reverberation of the transducer includes configuring the transducer controller to measure a decay time of the reverberation, and to disable the operation to measure the reverberation period responsively to the decay time having a value that is less than a first time interval or to enable the operation to measure the reverberation period responsively to the decay time having the value that is no less than the first time interval.

In an embodiment, the method may include configuring the transducer controller to assert a decay time error signal responsively to the decay time having the value that is no less than the first time interval, and configuring the transducer controller to assert a transducer error signal responsively to receiving the asserted state of the decay time error signal consecutively for a first number of consecutive repeated sequences wherein each sequence includes the operations of measure the reverberation period and adjust the first period.

Another embodiment may include configuring the transducer controller to drive the transducer at a second frequency having a third period subsequently to calculating the distance.

An embodiment may include configuring the transducer controller to adjust the first period includes configuring the transducer controller to increase the first period responsively to the reverberation period being substantially less than the first period and to decrease the first period responsively to the reverberation period being substantially greater than the first period.

Those skilled in the art will appreciate that one embodiment of a method of forming a transducer controller may comprise: configuring a transducer controller to form an integrated distance measuring and diagnostic cycle that includes measuring a decay time of a transducer and to selectively adjusting a period of the transmitted signal responsively to the value of the decay time. The controller is configured to adjust the drive signal period an amount responsively to a difference between the reverberation period of the transducer and the period of the drive signal.

In view of all of the above, it is evident that a novel device and method is disclosed. Included, among other features, is forming transduce controller to form an integrated distance measuring and diagnostic cycle. Configuring the controller to form the diagnostic phase during a reverberation cycle of the transducer eliminates the need to perform the diagnostic operations in a separate cycle thereby improving the performance of the system that uses the controller. Configuring the controller to adjust a value of the period of the drive signal responsively to the value of the decay time and the value of the reverberation period results in improved accuracy of the measurements performed by the system that used the controller. Configuring the controller to sue the decay time to determine if an adjustment of the drive signal period is needed also reduces excess adjustments and improves the efficiency.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. An transducer controller comprising:
a transmit control circuit configured to form a first drive signal having a first period and a first frequency to excite a transducer to emit a first emitted signal;
a decay time circuit configured to measure a decay time interval for reverberations of the transducer to decay to a first value wherein the reverberations are in response to the first emitted signal;
a control circuit configured to assert a decay time error signal responsively to the decay time interval being no less than a first value;
a reverberation period circuit configured to measure a reverberation period of the reverberations responsively to an asserted state of the decay time error signal;
the control circuit configured to adjust the first period responsively to a difference between the first period and the reverberation period including increase the first period responsively to the reverberation period being less than the first period and to decrease the first period responsively to the reverberation period being no less than the first period; and
the transducer controller configured to, subsequently to the adjust the first period, receive a first reflected signal representative of a reflection of the first emitted signal and to use the first reflected signal to calculate a distance of an object from the transducer.

2. The transducer controller of claim 1 wherein the transducer controller is configured to assert a transducer error signal responsively to receiving the asserted state of the decay time error signal consecutively for a first number of consecutive repeated sequences wherein each sequence includes operations to form a drive signal, adjust the first period, and measure a distance using reverberations from the drive signal.

3. The transducer controller of claim 2 wherein the transducer controller is configured to terminate forming the first drive signal responsively to the asserted state of the transducer error signal.

4. The transducer controller of claim 1 further including a signal processing circuit configured to receive the first reflected signal and to calculate distance information from the reflected signal.

5. The transducer controller of claim 1 wherein the reverberation period circuit includes a circuit to determine a time for a plurality of reverberation periods, to store a value for each of the plurality of reverberation periods, and to form an average value of the stored values, and to compare the average value to the first period to determine how to adjust the first period.

6. The transducer controller of claim 5 wherein the reverberation period circuit includes a memory circuit and wherein the reverberation period circuit stores the value in the memory circuit.

7. The transducer controller of claim 1 wherein the control circuit is configured to adjust the first period responsively to a difference of at least a first percent between the first period and the reverberation period wherein the first percent is a percent of the first period.

8. The transducer controller of claim 7 wherein the first percent is approximately one half of a percent of the first period.

9. The transducer controller of claim 7 wherein the control circuit is configured to adjust the first period by approximately the first percent.

10. A method of forming a transducer controller comprising:
configuring the transducer controller to form a first drive signal having a first period and a frequency to excite a transducer to emit a first emitted signal;
configuring the transducer controller to terminate the first drive signal;
configuring the transducer controller to measure a second period of a reverberation signal formed by a reverberation of the transducer resulting from terminating the first drive signal;
configuring the transducer controller to adjust the first period responsively to a value of the second period;
configuring the transducer controller to conduct a distance measuring operation subsequently to measuring the second period wherein the distance measuring uses a distance signal received by the transducer controller and includes a reflection of at least a portion of the first emitted signal; and
configuring the transducer controller to form another drive signal to excite the transducer wherein the another drive signal has a third period that is different from the first period.

11. The method of claim 10 further including configuring the transducer controller to adjust the first period prior to receiving the reflection.

12. The method of claim 10 wherein configuring the transducer controller to adjust the first period includes configuring the transducer controller to increase the first period responsively to the second period being substantially less than the first period and to decrease the first period responsively to the second period being substantially greater than the first period.

13. The method of claim 10 further including configuring the transducer controller to measure a decay time of the transducer subsequently to the operation to terminate the first drive signal wherein the operation to measure the second period is performed in parallel to at least a portion of the operation to measure the decay time.

14. The method of claim 13 further including configuring the transducer controller to inhibit the operation to measure the second period responsively to the decay time being substantially less than a first value and to enable the operation to measure the second period responsively to the decay time being approximately no less than the first value.

15. A method of forming a transducer controller comprising:
configuring the transducer controller to drive a transducer with a first period to form a first emitted signal and to use a reflection from the first emitted signal to measure a distance to an object;
configuring the transducer controller to measure a reverberation period of a reverberation of the transducer formed in response to the first emitted signal;
configuring the transducer controller to adjust the first period responsively to the reverberation period wherein measure the reverberation period and adjust is a portion of the operation to measure the distance to the object; and
configuring the transducer controller to, subsequently to adjust the first period, receive the reflected signal from the first emitted signal and to use the reflected signal to calculate the distance.

16. The method of claim 15 wherein configuring the transducer controller to measure the reverberation period of the reverberation of the transducer, and to adjust the first period includes configuring the transducer controller to terminate driving the transducer, and to measure the reverberation period between terminating the drive signal and receiving the reflected signal from the emitted signal.

17. The method of claim 15 wherein configuring the transducer controller to measure the reverberation period of the reverberation of the transducer includes configuring the transducer controller to measure a decay time of the reverberation, and to terminate measuring the reverberation period responsively to the decay time having a value that is less than a first time interval or to enable measuring the reverberation period responsively to the decay time having the value that is no less than the first time interval and less than a second time interval.

18. The method of claim 17 further including configuring the transducer controller to assert a decay time error signal responsively to the decay time having the value that is no less than the second time interval, and
configuring the transducer controller to assert a transducer error signal responsively to asserting the decay time error signal consecutively for a first number of consecutive repeated sequences wherein each sequence includes operations of measure the reverberation period and adjust the first period.

19. The method of claim 15 further including configuring the transducer controller to drive the transducer at a second frequency having a third period subsequently to calculating the distance.

20. The method of claim 15 wherein configuring the transducer controller to adjust the first period includes configuring the transducer controller to increase the first period responsively to the reverberation period being substantially less than the first period and to decrease the first period responsively to the reverberation period being substantially greater than the first period.

* * * * *